(12) United States Patent
Bailey

(10) Patent No.: US 12,461,066 B2
(45) Date of Patent: Nov. 4, 2025

(54) CONDENSATION MITIGATION IN IONIZATION SENSING

(71) Applicant: Applications Uniques Ltd., Longmont, CO (US)

(72) Inventor: Douglas Bailey, Johnstown, CO (US)

(73) Assignee: Applications Uniques Ltd., Johnstown, CO (US)

( * ) Notice: Subject to any disclaimer, the term of this patent is extended or adjusted under 35 U.S.C. 154(b) by 308 days.

(21) Appl. No.: 18/342,162

(22) Filed: Jun. 27, 2023

(65) Prior Publication Data

US 2025/0003925 A1    Jan. 2, 2025

(51) Int. Cl.
*G01N 27/626*    (2021.01)

(52) U.S. Cl.
CPC ................. *G01N 27/626* (2013.01)

(58) Field of Classification Search
CPC .............. G01N 27/626; G01N 27/66
USPC ...................... 324/468, 464, 459
See application file for complete search history.

(56) References Cited

U.S. PATENT DOCUMENTS

| | | | |
|---|---|---|---|
| 6,646,444 B2 | 11/2003 | Dolgov et al. | |
| 6,717,413 B1* | 4/2004 | Danyluk | G01N 27/62 |
| | | | 324/459 |
| 7,046,012 B2 | 5/2006 | Dean et al. | |
| 8,922,219 B2* | 12/2014 | Li | G01N 27/70 |
| | | | 324/459 |
| 10,634,644 B2* | 4/2020 | Shinada | G01N 27/66 |
| 2012/0136268 A1 | 5/2012 | Li et al. | |
| 2014/0151545 A1 | 6/2014 | Denton et al. | |
| 2014/0347062 A1* | 11/2014 | Stearns | G01N 27/64 |
| | | | 324/464 |
| 2016/0341698 A1* | 11/2016 | Shinada | G01N 27/66 |
| 2023/0266272 A1* | 8/2023 | Blöcker | G01N 27/66 |
| | | | 324/464 |

FOREIGN PATENT DOCUMENTS

KR        102539118 B1    6/2023

OTHER PUBLICATIONS

Park, Tae Wook; Written Opinion of the International Searching Authority for International Application PCT/US2024/035523, Oct. 8, 2024, pp. 1-9.

* cited by examiner

*Primary Examiner* — Giovanni Astacio-Oquendo
(74) *Attorney, Agent, or Firm* — MP Patents, LLC

(57) ABSTRACT

An ionization sensor includes a polarizing electrode, a signal electrode, a first dielectric layer separating the signal electrode from the polarizing electrode and a heating element configured to heat the polarizing electrode and/or the signal electrode. A method for ionization sensing includes providing a detection cell and, through a window, illuminating the detection cell with ultraviolet light while heating the detection cell, the window, or both.

24 Claims, 5 Drawing Sheets

CONDENSATION MITIGATION IN IONIZATION SENSING

SUMMARY

The disclosure describes an ionization detector. The ionization detector includes a polarizing electrode, a signal electrode, a first dielectric layer separating the signal electrode from the polarizing electrode and a heating element configured to heat the polarizing electrode.

The disclosure also describes a method for sensing ionization. The method includes providing a detection cell and, through a window, illuminating the detection cell with ultraviolet light. The detection cell is heated.

Further, the disclosure describes an ionization sensor. The ionization sensor includes a detection cell, a window provided to the detection cell and a radiation source configured to illuminate a portion of the detection cell through the window. The detection cell includes a polarizing electrode, a signal electrode, a first dielectric layer separating the signal electrode from the polarizing electrode, a heating element between the first dielectric layer and the signal electrode and a second dielectric layer separating the heating element from the signal electrode.

BRIEF DESCRIPTION OF THE FIGURES

The summary above, as well as the following detailed description of illustrative embodiments, is better understood when read in conjunction with the appended drawings. For the purpose of illustrating the disclosure, example constructions of the disclosure are shown in the drawings. However, the disclosure is not limited to specific methods and instrumentalities disclosed herein. Moreover, one having skill in the art will understand that the drawings are not to scale. Wherever possible, like elements have been indicated by identical numbers.

Embodiments of the disclosure will now be described, by way of example only, with reference to the following diagrams wherein.

DETAILED DESCRIPTION

Figure 1:
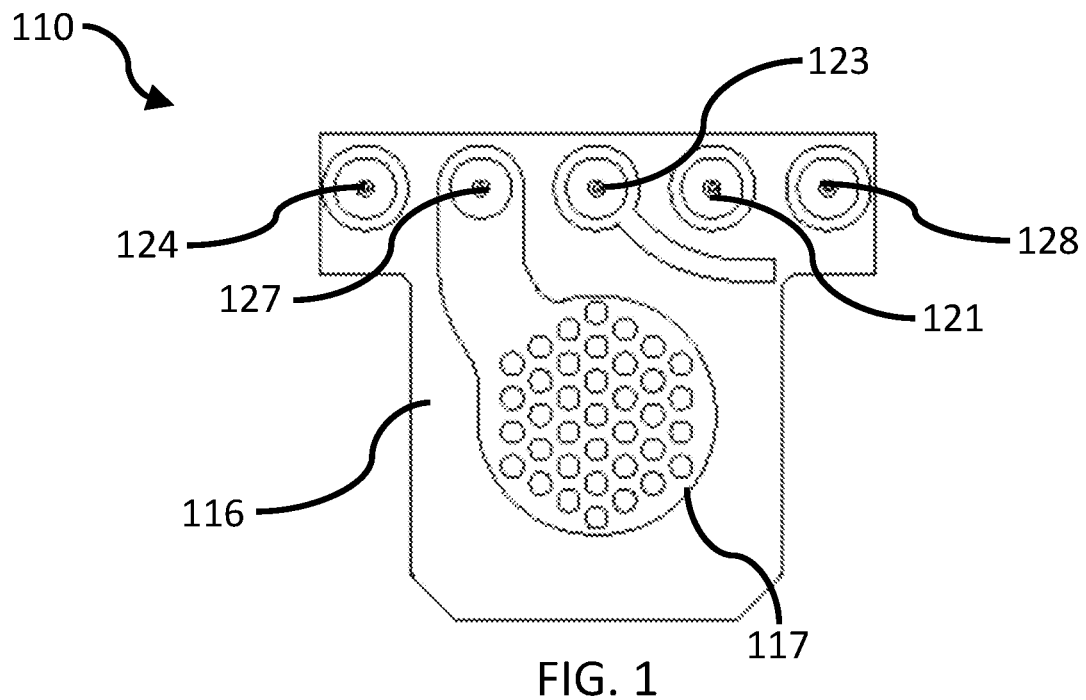
FIG. 1 illustrates a top view of an example detection cell.
Figure 2:
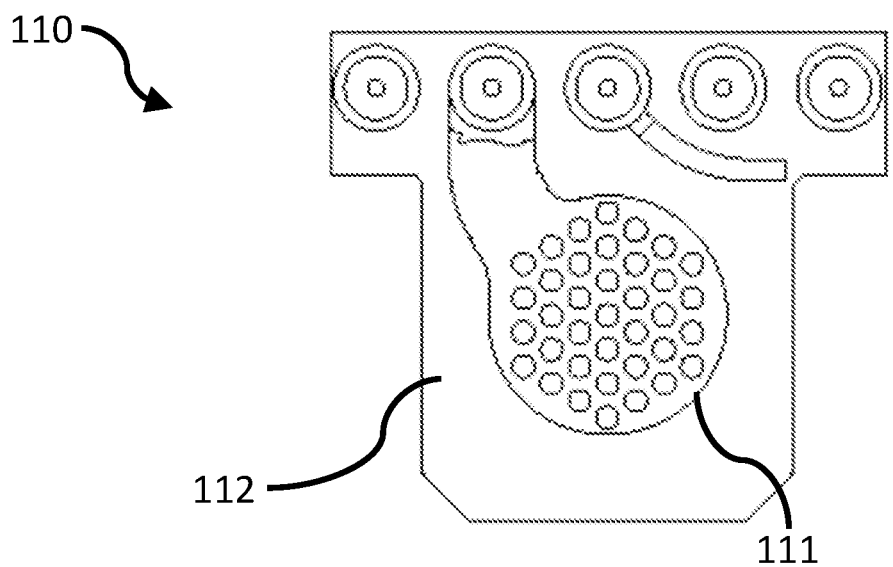
FIG. 2 illustrates a bottom view of the example detection cell of FIG. 1.
Figure 3:
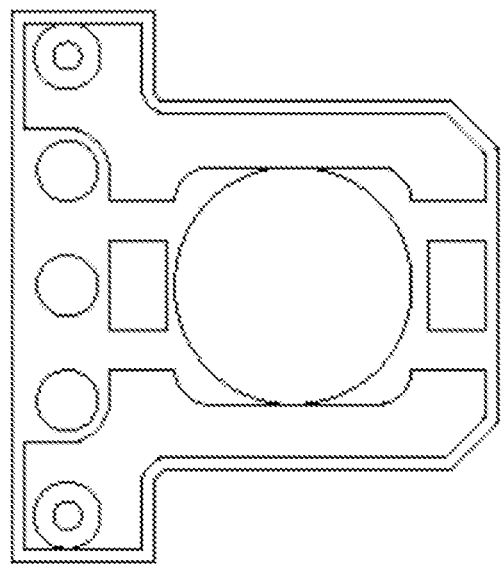
FIG. 3 illustrates a top view of an example resistive heating layer.
Figure 4:
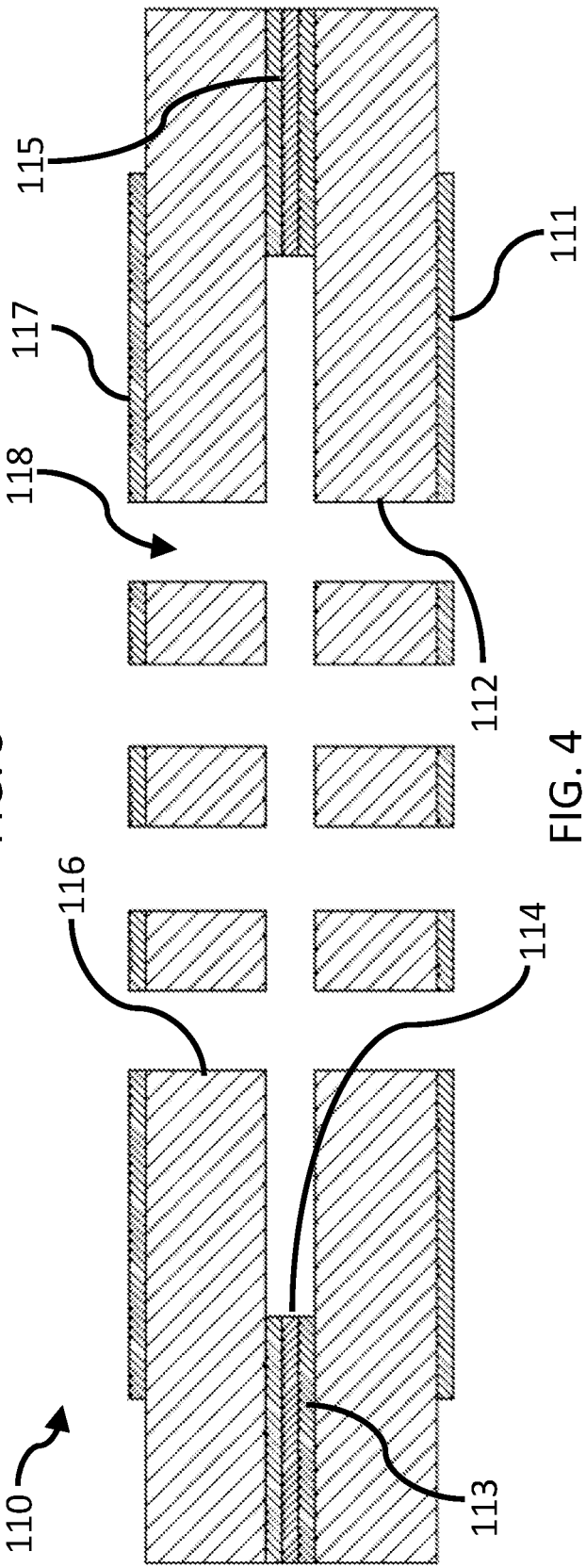
FIG. 4 illustrates a cross-sectional view of the example detection cell of FIGS. 1 & 2.

The following detailed description illustrates embodiments of the disclosure and manners by which they may be implemented. Although the best mode of carrying out embodiments of the disclosure has been disclosed, those skilled in the art would recognize that other embodiments are also possible.

It should be noted that the terms "first", "second", and the like, herein do not denote any order, quantity, or importance, but rather are used to distinguish one element from another. Further, the terms "a" and "an" herein do not denote a limitation of quantity, but rather denote the presence of at least one of the referenced item.

Ionization sensors and particularly photoionization sensors are used worldwide for measuring total volatile organic compounds (VOCs) in environmental monitoring applications. A photoionization sensor measures a current developed by VOC molecules ionized by a radiation source through a window. A relation between the current and the number of ionized molecules gives a measure of total VOC content in the local environment of the sensor.

The detection cell within the photoionization detector (PID) typically has several layers of metal screens, metal plates or printed-circuit type electrodes separated by solid dielectric materials or air. These layers serve to efficiently collect signal from the charges liberated during photoionization of compounds within internal volumes of the detection cell.

Existing photoionization sensors are vulnerable to effects from condensation of moisture. Due to the nature of their application, these sensors are exposed to environmental conditions which include almost daily condensing atmospheric conditions. Condensed moisture within the sensor causes various detrimental effects undermining analytical performance and causing premature failure of the device. Moisture may absorb radiation from the source reducing the amount of radiation available to produce a measurement signal, may create a conductive path between the electrodes and/or may obscure the radiation source, the window or both. Liquid water can also promote the formation of acids in solution corroding the detector components.

Keeping the detection cell and the window of the radiation source warmer than the surrounding environment eliminates condensation on the internal surfaces of components within the sensor. By strategically focusing heat on functional areas of the sensor, disclosed embodiments solve problems caused by condensation and do so with minimal power consumption cost.

Embodiments of the disclosure substantially eliminate, or at least partially address, problems in the prior art, enabling improved sensing of volatile organic compounds with reduced condensation on sensor functional components.

Additional aspects, advantages, features and objects of the disclosure will be made apparent from the drawings and the detailed description of the illustrative embodiments construed in conjunction with the appended claims that follow.

It will be appreciated that features of the disclosure are susceptible to being combined in various combinations without departing from the scope of the disclosure as defined by the appended claims.

FIGS. 1-5 illustrate an example ionization sensor detection cell 110 and associated components. Detection cell 110 includes a polarizing electrode 111 and a signal electrode 117. The positively charged, signal electrode 117, attracts electrons while the negatively charged, polarizing electrode 111, attracts positively charged molecules stripped of electrons by the ionizing radiation. A first dielectric layer 112 separates polarizing electrode 111 from signal electrode 117.

A heating element 114 is configured to heat polarizing electrode 111 and/or signal electrode 117 and/or first dielectric layer 112. Heating element 114 may be provided between the first dielectric layer 112 and signal electrode 117 such that the first dielectric layer 112 also separates heating element 114 from polarizing electrode 111. A second dielectric layer 116 may separate signal electrode 117 from heating element 114 and polarizing electrode 111. Heating element 114 may be provided between a window/lens and signal electrode 117, between a window/lens and the polarizing electrode 111, between a lamp and the signal electrode 117 or between a lamp and the polarizing electrode 111. In an example, heating element 114 comprises carbon fibres.

For simplified drive circuitry, heating element 114 may be sized or otherwise configured to allow continuous heating and/or maintain a fixed heat output. As such, the complication of control circuitry can be eliminated. Heating element 114 may run continuously for a long duration while power is applied since many applications for disclosed sensors are implemented for continuous operation for full year or more. In an example, heating element 114 consumes between about 0.25 and 0.50 watts.

Alternatively, the detection cell may further include a hydration sensor and temperature control circuitry configured to adjust output of a heating element in accordance with a humidity level measured by the humidity sensor. Such an arrangement may consume more power than a fixed-output heating element.

The detection cell may further include first and second layers of ground or fence electrode 113 and 115 sandwiching heating element 114. Fence electrode 113 may be provided between first dielectric layer 112 and heating element 114 while fence electrode 115 may be provided between heating element 114 and second dielectric layer 116. Fence electrodes 113 and 115 may contribute to mitigation of moisture issues by blocking the path between the signal and polarizing electrodes.

A pin connector 121 is coupled with polarizing electrode 111, a pin connector 127 is coupled with signal electrode 117 and a pair of pin connectors 124 and 128 are coupled with heating element 114. The detection cell further includes a pin connector 123 coupled with fence electrodes 113 and 115.

Detection cell 110 may be about 4.0 mm wide and about 2.0-3.0 mm thick. Dielectric layers 112 and 116 may be provided as any of a variety of materials including but not limited to solids and gasses. In an example, dielectric layers 112 and 116 are formed from or otherwise include a fluoropolymer such as polytetrafluoroethylene. In another example, air provides one more dielectric layers.

Figure 6:
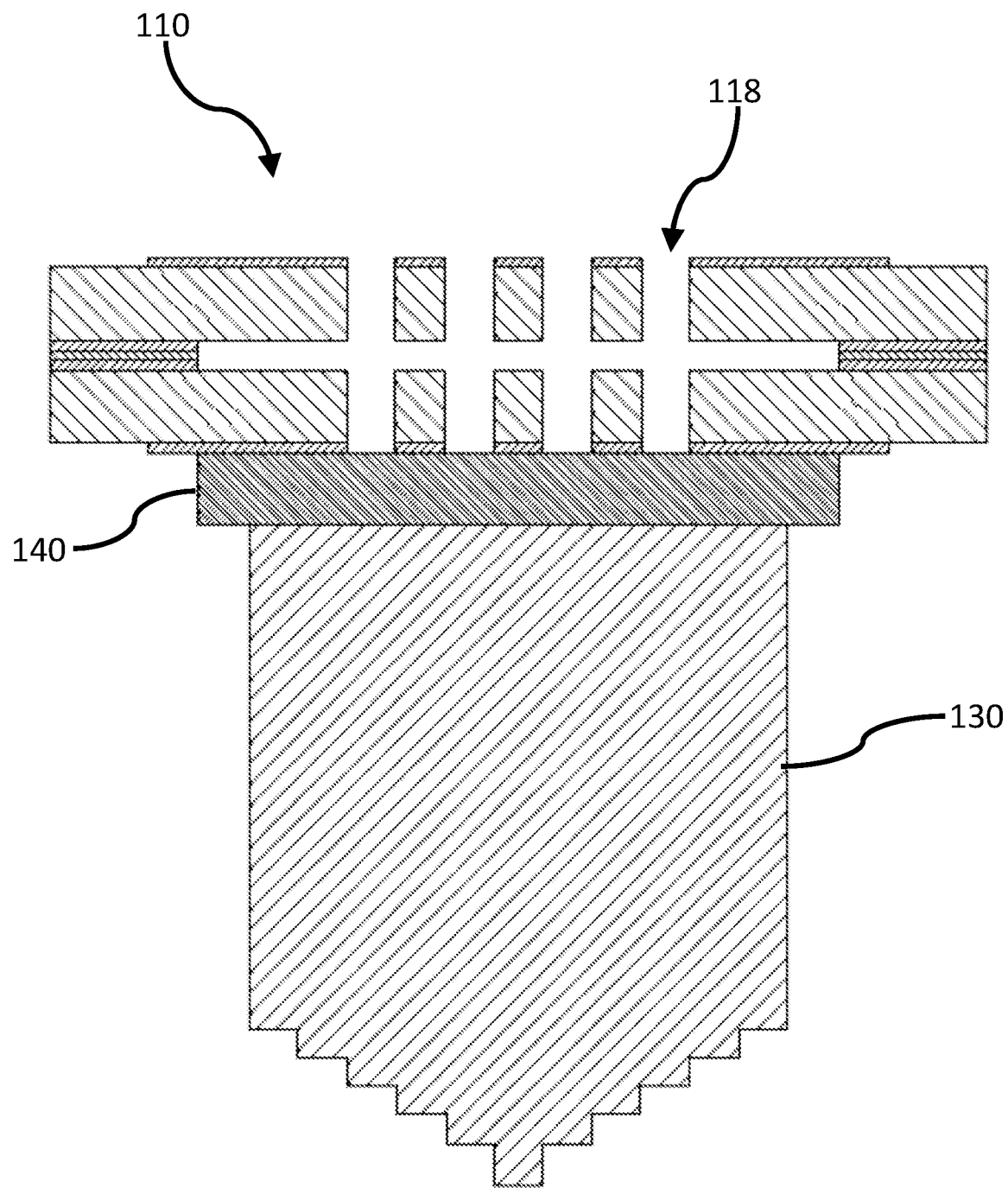
FIG. 6 illustrates a cross-sectional view of an example ionization sensor.

Polarizing electrode 111, signal electrode 117 and first and second dielectric layers 112 and 116 together comprise a detection cell 110. To form an ionization sensor, a radiation source 130 such as a vacuum-ultra-violet (VUV) lamp or light is provided to detection cell 110 and a lens or window 140 is provided between radiation source 130 and detection cell 110. FIG. 6 illustrates a cross-sectional view of an example ionization sensor. Radiation source 130 is configured to illuminate portions of detection cell 110 through window 140. In an example, energies emitted from radiation source 130 are between about 8 and about 12 eV.

The ionization sensor further includes one or more open volumes 118 where ionization of gas and collection of produced charges takes place. In an example, open volumes 118 are formed in or through polarizing electrode 111, signal electrode 117, first dielectric layer 112 and/or second dielectric layer 116.

The ionization sensor further includes a high voltage source 150 providing potential of 100V DC or more. In an example, heating element 114 is powered by the same voltage source.

Figure 7:
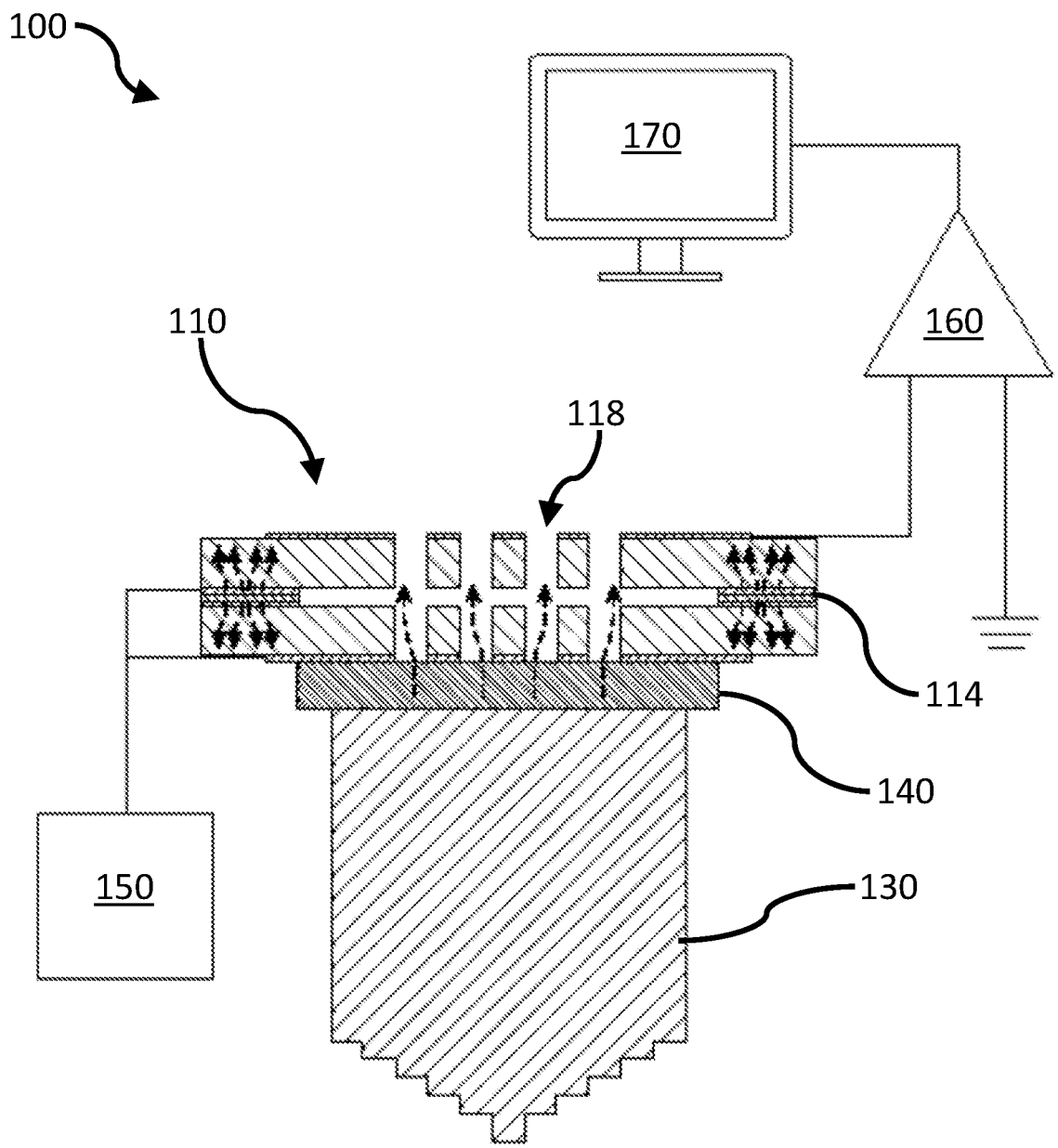
FIG. 7 schematically illustrates an example ionization sensor system.

Referring to FIG. 7, an ionization sensor system 100 further includes an amplifier 160 and associated circuitry configured to produce a signal representative of measured gas concentration. A display 170 may be configured to present one or more of various lines, bars, curves, graphs, plots, tables, etc. enabling a user to interpret measured gas concentrations, heat output, drive voltage, battery life, etc.

Figure 5:
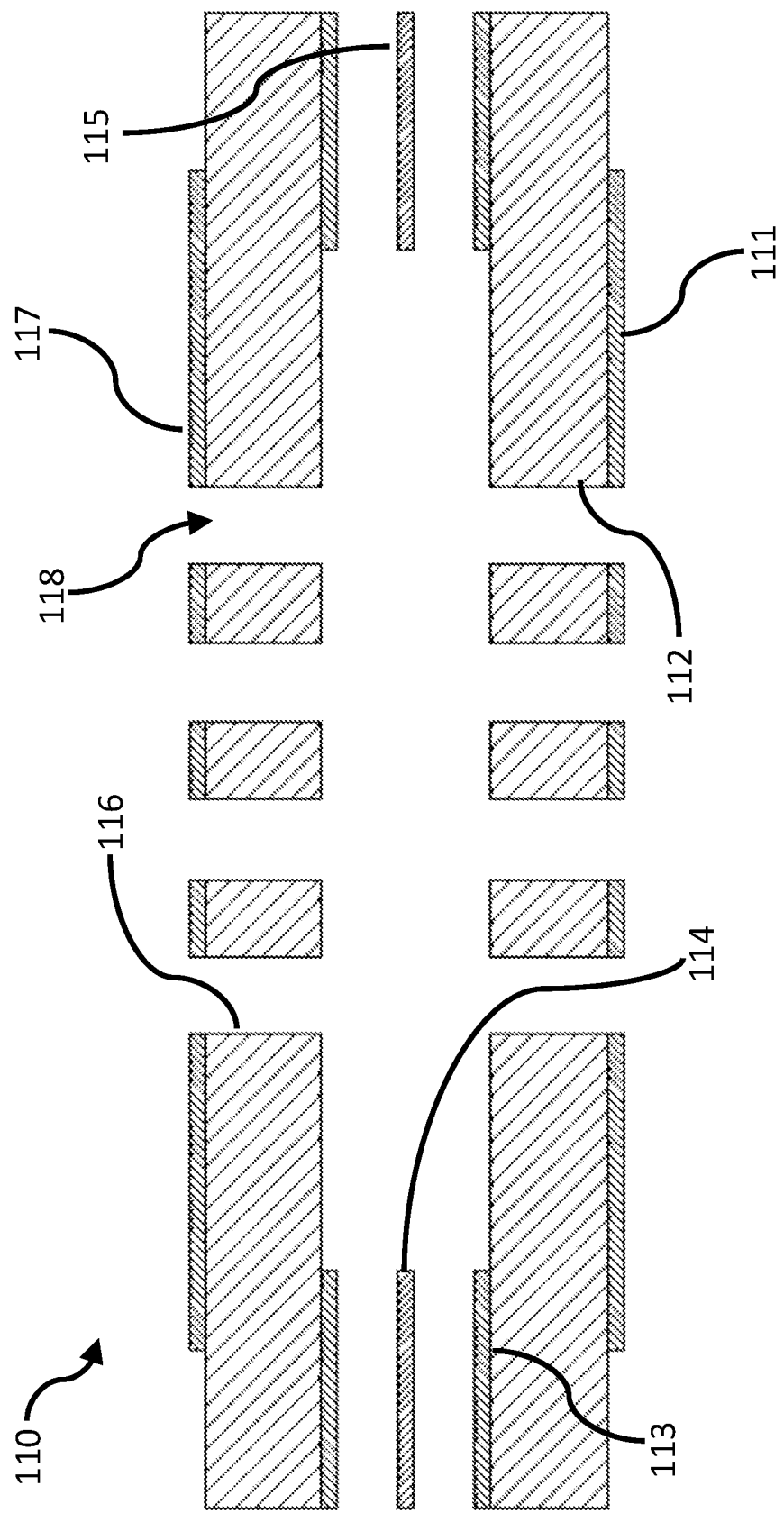
FIG. 5 illustrates an exploded, cross-sectional view of the example detection cell of FIGS. 1-4.

Disclosed ionization sensors and detection cells may be manufactured according to any of a variety of methods. In an example method for manufacturing, a heating element is sandwiched between a first half-cell having a polarizing electrode and a first dielectric layer and a second half-cell having a signal electrode and a second dielectric layer (FIG. 5). The first half-cell may be provided with a first ground electrode and the second half-cell may be provided with a second ground electrode. The heating element may be provided by printing as an extra layer of the detection cell on the first dielectric layer or the second dielectric layer.

Disclosed ionization sensors, ionization detectors and detector cells are suitable for use in association with any of a variety of methods for ionization detection. The methods may be described as collections of actions in logical flows which may be implemented in hardware, software, or a combination thereof. An example method includes providing a detection cell, illuminating the detection cell through a window with VUV light while heating the detection cell, the window, or both. FIG. 7 illustrates an example ionization sensor wherein example internal volumes of a detection cell are illuminated (represented by broken-line arrows) while a heating element radiates heat (also represented by broken-line arrows). Pin connectors are electrified to activate the electrodes and the heating device.

The detection cell may be provided by bonding a signal electrode layer to a first side of a dielectric layer and bonding a polarizing electrode layer to a second, opposite side of the dielectric layer. Further, the detection cell may be provided with a ground or fence electrode layer within the dielectric layer.

Illuminating a number of reaction volumes of the detection cell with the VUV light causes molecules of volatile organic compounds to ionize. Ions of the volatile organic compounds are collected with the signal electrode to produce a current. The current is then amplified (FIG. 7) to produce a signal representative of a measured gas concentration. The signal may be presented to a display (FIG. 7).

The detection cell, the window or both are heated to a temperature sufficient to prevent condensation on the detection cell, the window, or both. The heating may be continuous and/or may maintain a fixed heat output by energizing of a printed, resistive heater. In an example, the heating is provided by a heating element formed from carbon-fibres.

The actions described above with regard to methods for ionization sensor manufacture and/or methods for ionization detection are only illustrative and other alternatives can also be provided where one or more actions are added, one or more actions are removed, or one or more actions are provided in a different sequence without departing from the scope of the claims herein.

Embodiments of the disclosure are susceptible to being used for various purposes, including, though not limited to, enabling users to improve electrochemical sensing and associated sensing devices including metal oxide semiconductor devices.

Modifications to embodiments of the disclosure described in the foregoing are possible without departing from the scope of the disclosure as defined by the accompanying claims. Expressions such as "including", "comprising", "incorporating", "consisting of", "have", "is" used to describe and claim the disclosure are intended to be construed in a non-exclusive manner, namely allowing for items, components or elements not explicitly described also to be present. Reference to the singular is also to be construed to relate to the plural.

What is claimed is:

1. An ionization detector, comprising:
   a polarizing electrode;
   a signal electrode;
   a first dielectric layer separating the signal electrode from the polarizing electrode; and
   a resistive heating element configured to heat the polarizing electrode.

2. The ionization detector as set forth in claim 1, wherein the heating element is provided between the first dielectric layer and the signal electrode.

3. The ionization detector as set forth in claim 1, wherein a second dielectric layer separates the heating element from the signal electrode.

4. The ionization detector as set forth in claim 1, further comprising a first fence electrode between the first dielectric layer and the heating element.

5. The ionization detector as set forth in claim 4, further comprising a second fence electrode between the heating element and a second dielectric layer.

6. The ionization detector as set forth in claim 1, further comprising a fence electrode between the heating element and a second dielectric layer.

7. The ionization detector as set forth in claim 1, wherein the polarizing electrode, the signal electrode and the first dielectric layer comprise a detection cell and wherein a radiation source is provided to the detection cell.

8. The ionization detector as set forth in claim 1, wherein the polarizing electrode, the signal electrode and the first dielectric layer comprise a detection cell and wherein a window is provided to the detection cell.

9. The ionization detector as set forth in claim 1, wherein the polarizing electrode, the signal electrode and the first dielectric layer comprise a detection cell and a wherein a radiation source is provided to the detection cell and a window is provided between the radiation source and the detection cell.

10. The ionization detector as set forth in claim 1, further comprising a hydration sensor and temperature control circuitry configured to adjust output of the heating element in accordance with a humidity level measured by the humidity sensor.

11. A method for sensing ionization, comprising:
    providing a detection cell;
    through a window, illuminating the detection cell with ultraviolet light; and
    heating the detection cell.

12. The method as set forth in claim 11, wherein the heating further comprises heating to a temperature sufficient to prevent condensation on the detection cell, and the window, or both.

13. The method as set forth in claim 11, wherein the heating further comprises heating continuously.

14. The method as set forth in claim 11, wherein the heating further comprises maintaining a fixed heat output.

15. The method as set forth in claim 11, wherein providing the detection cell further comprises providing a signal electrode layer bonded to a dielectric layer bonded to a polarizing electrode layer.

16. The method as set forth in claim 15, wherein providing the detection cell further comprises providing a fence electrode layer within the dielectric layer.

17. An ionization sensing system, comprising:
    a detection cell including:
       a polarizing electrode;
       a signal electrode;
       a first dielectric layer separating the signal electrode from the polarizing electrode;
       a heating element between the first dielectric layer and the signal electrode;
       a second dielectric layer separating the heating element from the signal electrode;
    a window provided to the detection cell; and
    a radiation source configured to illuminate a portion of the detection cell through the window.

18. The system as set forth in claim 17, further comprising one or more open volumes where ionization of gas and collection of produced charges takes place.

19. The system as set forth in claim 18, wherein the plurality of open volumes are formed in the polarizing electrode, the signal electrode, the first dielectric layer and/or the second dielectric layer.

20. The system as set forth in claim 17, further comprising an amplifier and associated circuitry configured to produce a signal representative of measured gas concentration.

21. An ionization detector, comprising:
    a polarizing electrode;
    a signal electrode;
    a first dielectric layer separating the signal electrode from the polarizing electrode; and
    a resistive heating element configured to heat the signal electrode.

22. A method for sensing ionization, comprising:
    providing a detection cell;
    through a window, illuminating the detection cell with ultraviolet light; and
    heating the window.

23. An ionization detector, comprising:
    a polarizing electrode;
    a signal electrode;
    a first dielectric layer separating the signal electrode from the polarizing electrode; and
    a resistive heating element configured to heat the polarizing electrode and the signal electrode.

24. A method for sensing ionization, comprising:
    providing a detection cell;
    through a window, illuminating the detection cell with ultraviolet light; and
    heating the detection cell and the window.

* * * * *